Dec. 16, 1958  E. L. D'OUVILLE ET AL  2,864,761
PROCESS OF HYDROGEN RECOVERY AND RECYCLE
Filed June 30, 1954

INVENTORS:
Edmond L. d'Ouville
John W. Mohlman
BY
ATTORNEY

United States Patent Office 2,864,761
Patented Dec. 16, 1958

2,864,761

PROCESS OF HYDROGEN RECOVERY AND RECYCLE

Edmond L. d'Ouville, La Grange, and John William Mohlman, Chicago, Ill., assignors to Standard Oil Company, Chicago, Ill., a corporation of Indiana Application June 30, 1954, Serial No. 440,354

8 Claims. (Cl. 208—97)

This invention relates to means for separating and purifying hydrogen in conversion processes which require the presence of hydrogen and which provide hydrogen wholly or in part by recirculation to the conversion from the product recovery stage. More particularly, it relates to means for facilitating recycle of hydrogen gas at elevated temperature and pressure in a hydrocarbon hydro-conversion process such as catalytic hydroforming.

In catalytic hydroforming, the recycle gas stream provides the chief vehicle for supplying heat to the reforming process. The major reforming reactions are highly endothermic so that large amounts of heat are required to initiate the desired reactions and are absorbed in the course of the reactions. The amount of heat that can be supplied to the process by preheating the hydrocarbon to the process is limited because of the desirability of minimizing purely thermal reactions which are less desirable in terms of octane values obtainable and gas formation. The amount of heat that can be supplied to the process from the catalyst as an incident to regeneration is limited because the catalyst temperature should not be carried much above about 1100° F. for fear of sintering or deactivation, and in the case of reforming with platinum type catalysts, is non-existent or inconsequential because the oil processing time is disproportionate to catalyst regeneration time even for relatively short cycle regenerative processes. The heat input problem is particularly acute with catalytic hydroforming processes of the fluid catalyst type since a single reactor is used rather than multiple reactors as in fixed bed reforming where interstage reheating is feasible. Consequently, the conventional procedure for separating hydrogen gas from the reforming reaction effluent for recycle by cooling, flashing, recompressing and reheating is costly and uneconomic. It is an object of our invention to provide means for recovery of hydrogen from the reaction effluent without extensive cooling so as to reduce the amount of recompression and reheating required.

A special problem exists with processes using platinum type catalysts because hydrocarbon charge stocks usually contain minor amounts of sulfur, oxygen, nitrogen, arsenic containing impurities which may build-up in the hydrogen gas recycle system to an extent poisoning the catalyst. It is a further object of our invention to effect purification of hydrogen recycles to the conversion while separating it from the conversion effluent.

According to our invention, effluent from the conversion zone is a process such as catalytic hydroforming of naphtha charge stocks is contacted without cooling or condensation with molten sodium under conditions of temperature and pressure promoting absorption of hydrogen as sodium hydride. Thus the invention is based in part on the discovery that a molten metal such as sodium under the elevated conditions of temperature and pressure characteristic of catalytic hydroforming forms an equilibrium hydride mixture by direct hydrogen absorption in the molten metal from which hydrogen can be regenerated at a temperature and pressure suitable for recycle by subsequent thermal decomposition. The invention provides a system for hot hydrogen recycle in catalytic conversion processes wherein the effluent from the conversion at substantially the temperature and pressure of the conversion is contacted with a molten metal such as sodium under a regulated temperature-pressure relationship promoting hydride formation. The unabsorbed effluent is passed to product recovery in the usual manner. The hydride containing molten metal contact material is treated for regeneration of hot hydrogen for recycle to the conversion by adjusting the temperature-pressure relationship to conditions favoring hydride decomposition. Advantageously, the process is conducted by limiting the extent of hydride formation so that the hydride-molten metal mixture remains sufficiently fluid for transfer by pumping between separate absorption and decomposition zones. It is desirable to adjust the decomposition conditions of temperature and pressure by reduction in pressure and by indirectly heat-exchanging material withdrawn from the absorption zone with material undergoing hydride formation in the absorption zone so as to absorb heat from the exothermic chemical combination. In more specific aspects of our invention, means are provided for removing non-hydrocarbon impurities such as sulfur, nitrogen and oxygen compounds which are normally associated with hydrocarbon feed stocks and which react with molten metals from the conversion and hydrogen recovery cycle so as to prevent build-up in the molten metal hydride system or contamination of the conversion catalyst.

The accompanying drawings disclose simple embodiments of the invention in the form of diagrammatic process flow plans.

Figure 1:
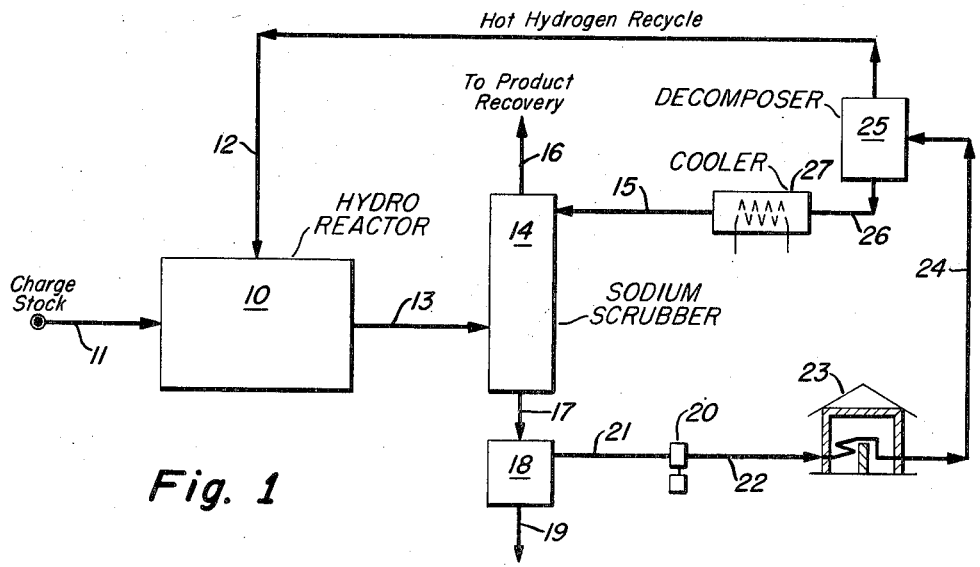
Figure 1 shows application of the invention in generalized form.

In the flow plan of Figure 1, charge stock enters reactor 10 from line 11 and hydrogen is recycled from the recovery system by means of line 12. In practice, the charge stock is preheated in equipment which is not shown, the hydrogen recycle may be admixed with the charge stock prior to entering the reactor, and one or more reactors may be employed. The effluent from reactor 10 is passed by connection 13 to sodium scrubber 14. Molten sodium is admitted to the top of scrubber 14 by line 15 and passes downward in countercurrent contact with the incoming conversion effluent. Unabsorbed conversion vapors pass from scrubber 14 overhead by means of line 16 leading to the usual product recovery section. The molten metal and hydride phase is removed from scrubber 14 by connection 17 to sludge separator 18 from which solids such as catalyst carry-over from the conversion zone and sodium sulfide or sodium hydroxide formed by reaction of sulfur and oxygen impurities in the conversion effluent with sodium in scrubber 14 may be withdrawn from the system as indicated by line 19. The molten metal and hydride stream is pumped from sludge separator 18 by a pump suitable for handling liquid metals, for example by an electromagnetic type pump indicated diagrammatically at 20, via lines 21 and 22 through heater 23 and line 24 to decomposer 25. By appropriate change in the temperature and pressure conditions from a temperature less than the decomposition temperature for the metal hydride under the prevailing hydrogen partial pressure of scrubber 14 to a temperature higher than the decomposition temperature under the prevailing hydrogen partial pressure of decomposer 25, hydrogen is regenerated for recycle via line 12. The equilibrium molten contact material collecting in decomposer 25 is recirculated to scrubber 14 via line 26 and cooler 27 which may be provided to assist in maintaining heat balance between the exothermic absorption stage and the decomposition stage.

Figure 2:
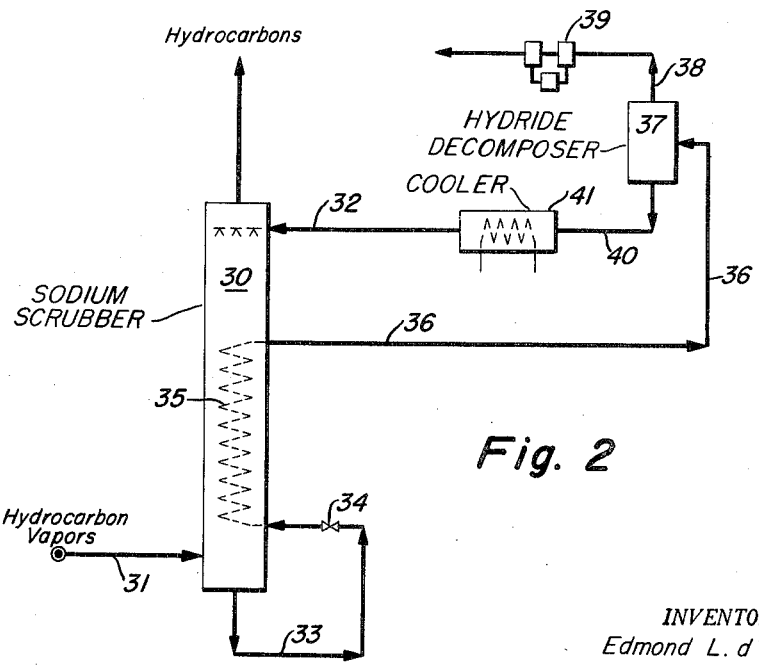
Figure 2 shows a more specific arrangement for effecting the hydrogen absorption and hydrogen regeneration operations.

In Figure 2, hydrocarbon vapors from the conversion reaction are shown entering the lower portion of scrubber 30 from line 31. Recirculated molten metal contact medium is admitted to an upper portion of absorber 30 from line 32 and passes in counter-current contact with the entering hydrocarbon vapors. The desired equilibrium mixture of molten metal and hydride is withdrawn from the bottom of scrubber 30 as by connection 33 and after reduction in pressure controlled by valve 34 is passed through coil 35 situated in the absorption section of scrubber 30 in heat exchange relation with molten material passing downwardly through the tower in scrubbing contact with entering hydrocarbons. In coil 35, heat is absorbed by the equilibrium molten metal and hydride mixture which is then introduced via line 36 to hydride decomposer-separator drum 37. Although the type of heat balance operation illustrated in Figure 2 requires some reduction in pressure below the conversion pressure level, the hydrogen released in decomposer-separator 37 for recycle to the conversion zone via line 38 is still at an elevated pressure well above atmospheric so that it may be raised to the conversion pressure in a single stage compressor suitable for handling hot gases as indicated at 39. Molten metal is recirculated from drum 37 to scrubber 30 by line 40 with appropriate adjustment of temperature by means of intermediate cooler 41.

Application of the invention to catalytic hydroforming provides substantial economies in the elimination of the conventional operations of condensing and flushing hydroformer effluent at 100° F. and about 50–100 p. s. i. g. followed by recompressing and reheating hydrogen gas for recycle to the 300–750 p. s. i. g. range and 900° F. level characteristic of catalytic hydroforming operations. Also, application of the invention provides greater flexibility in operating the hydroforming conversion because the optimum hydrogen to hydrocarbon ratio can be selected for the feed stock and conversion conditions employed rather than one fixed by the limitation that the amount of heat introduced with recycle gas must not exceed the maximum permissible tube temperature (about 1300° F.) of conventional fired heaters.

In the practice of the invention, sodium is the metal best meeting the practical requirements of the process. Sodium forms sodium hydride readily by direct combination with hydrogen under conditions of temperature and pressure characteristic of catalytic hydroforming in a reversible equilibrium reaction controllable by the relationship between the temperature and the hydrogen pressure. The decomposition pressure (or temperature) of sodium hydride can be calculated from the following equation (see Journal of the American Chemical Society, vol. 34, p. 779 (1912)).

$$\text{Log}_{10} p = -\frac{5700}{T} + 2.5 \log_{10} T + 3.956$$

where $p$ is the pressure in millimeters and $T$ is the temperature in degrees Kelvin. The equation was derived theoretically and checked with observed pressures up to one atmosphere. Although relatively high pressures are encountered under the conditions of the invention, the equation has been found to give reasonably accurate results when compared with data obtained at high pressures.

In controlling the operation of the sodium scrubber or absorption zone and that of the hydride decomposition zone several factors should be observed. The temperature in the absorption zone must be less than the decomposition temperature at a hydrogen partial pressure of the conversion which prevails in the absorption zone. The temperature in the decomposition zone must be higher than the decomposition temperature at the hydrogen pressure prevailing in that zone. For example, at a hydrogen partial pressure of 250 p. s. i. a. in the absorption zone, the temperature must be lower than about 985° F. for hydride formation whereas the converse is true in the decomposition zone. To facilitate handling the contact material, the extent of hydride formation should be limited to a concentration of sodium hydride in molten sodium corresponding to the solubility limit of the hydride since the latter is normally a solid at temperatures below the decomposition point. In the temperature regions of interest to the invention, the solubility limit of the hydride in molten sodium appears to be approximately 28%. It is possible, however, to exceed the solubility to some extent by handling the mixture as a fluid slurry of hydride and molten sodium.

Experimental work has shown that the pressure-temperature relationship for hydride decomposition is affected by the composition of the hydride-metal system and that for a given temperature, the decomposition pressure is lower for more dilute hydride systems. Since the reaction of sodium with hydrogen has been found to be retarded by formation of a crust of sodium hydride on the surface of the molten sodium, it is further desirable to provide equipment promoting good contact between the molten contact material and the conversion effluent in order to avoid handling too dilute a hydride system in the decomposition zone.

A number of other alkali and alkaline earth metals form equilibrium hydrides with hydrogen at elevated temperature and pressure and therefore appear suitable for use alone or in admixture with each other. For example, lithium, lithium-aluminum, calcium and barium are capable of forming equilibrium metal hydrides. The metals may be employed in the molten state as such or in solution in fused salt metals such as an eutectic melt composed of 40% potassium chloride and 60% lithium chloride, for example, which has a melting point of 666° F. Because of its availability, its low melting point (207° F) and its equilibrium characteristics, however, sodium is the most practical choice.

Our invention may be practiced with various catalytic hydroforming processes, for example, fixed bed, moving bed and fluid bed processes employing various catalysts such as platinum-alumina, molybdenum oxide-alumina, chromium oxide-alumina types. It is particularly advantageous however, in use with fluid hydroforming processes which, employing only a single reactor, have a particularly severe heat in-put problem since intermediate reheating cannot be readily employed as in the case of fixed bed hydroforming with multiple reactors. Also the process is particularly advantageous in use with platinum type catalytic processes because of the infeasibility of heat in-put by catalyst regeneration of platinum catalysts.

A special advantage of the invention as applied in the form of hydroforming processes using molybdenum oxide- or chromium oxide-alumina catalysts is that demethanization of the hydrogen recycle gas is effected by the sodium scrubbing to a degree unknown in conventional hydroforming. In conventional hydroforming with these catalysts, a rather lean hydrogen gas, e. g. about 60% hydrogen, compared to hydrogen recycle in a platinum catalyst process results. The presence of such large proportions of methane is disadvantageous with respect to octane appreciation and product distribution in the hydroforming reaction.

In a specific embodiment of the invention, described by way of example, the total effluent from a fluid hydroformer is fed at 300 p. s. i. a. and 900° F. into a liquid sodium scrubber. The effluent contains 80 mol percent hydrogen so that the hydrogen partial pressure at the bottom of the scrubber is 240 p. s. i. a. The heat of reaction generated by formation of sodium hydride raises the temperature at the bottom of the scrubber tower to 980° F. which is the equilibrium temperature for 240 p. s. i. a. of hydrogen over sodium hydride.

The melt of sodium and sodium hydride at 980° F. and 300 p. s. i. a. is reduced in pressure to 200 p. s. i. a. and is heat exchanged in the scrubber tower indirectly with the downcoming molten sodium scrubber liquid. At 200 p. s. i. a., the equilibrium temperature of sodium hydride is 968° F. so that the sodium hydride decomposes to sodium and ½ mol of hydrogen per mol of sodium hydride with absorption of heat provided by the existence of the temperature differential within the scrubber tower. The decomposition products are charged to a separator from which molten sodium is returned to the top of the scrubber tower. The amount of hydrogen in the scrubber tower off-gas is regulated by cooling the molten sodium stream introduced to the tower top, e. g. 1% hydrogen at 700° F. and 300 p. s. i. a. The hydrogen generated by sodium hydride decomposition is recovered from the separator at 968° F. and is compressed by a gas turbine type of centrifuging compressor designed to handle hot gases from 200 p. s. i. a. to 330 p. s. i. a. for recirculation to the hydroforming process.

For a fluid hydroformer charging 2000 barrels per day, using a molybdena oxide-alumina powdered catalyst and 6000 standard cubic feet per barrel of 60% hydrogen recycle gas at 1300° F., about 600 pounds per minute of sodium metal is required to extract the hydrogen for recycle. Advantageously, a greater amount is required for operating flexibility in the recovery system.

Additionally, the hydrogen recycle may be prescrubbed against an acidic material such as silica gel or may be cooled to reduce the sodium vapor content, or may be contacted with sodium active compounds such as a sulfur bearing hydrocarbon stream prior to recirculation in order to reduce sodium vapor concentration to the desired minimum.

At 1000° F., the sodium vapor pressure is about 0.1 p. s. i. a. Rather than return this small amount of sodium vapor to the conversion zone with the hydrogen recycled from the hydride decomposer, it may be desirable to scrub it from the hydrogen with an acidic substance. The scrubbing operation can be combined with a heating operation in order to heat the hydrogen to very high temperatures. For example, a hot liquid potassium chloride-lithium chloride salt eutectic may be employed as scrubbing and heating medium. Alternatively, hydrogen fluoride, hydrogen chloride, fluorine or chlorine in approximately stoichiometric amounts may be injected in the hydrogen stream recovered from the hydride decomposer. The resulting sodium fluoride or sodium chloride fog which is formed may be removed from the hydrogen stream by passage through a bed containing a suitable solid absorbent, e. g. a mixture of aluminum fluoride and alumina. For example, sodium fluoride forms a solid solution with aluminum fluoride and thereby lowers the sodium fluoride vapor pressure to less than $\frac{1}{10000}$ of 1 mm. of mercury at 1400° F. A mixture containing between 60 and 52 mol percent sodium fluoride in aluminum fluoride is liquid at 1400° F., and the eutectic of 53.5 mol percent sodium fluoride in aluminum chloride melts at 1250° F. Any excess hydrogen fluoride or hydrogen chloride which passes through the absorbent bed is not harmful and may be of some benefit in the hydroforming reaction. Following the absorbent bed, additional heat can be introduced if desired into the hydrogen recycle by furnace heating.

In order to prevent build-up of contaminants such as sodium sulfide, sodium oxide and/or sodium hydroxide in the circulating melt system, it is usually advantageous where the feed stock to the hydroformer reaction contains appreciable amounts of sulfur or oxygen containing impurities to operate a 2-stage process for contacting the hydroformer effluent. Thus, in the first stage, the effluent may be contacted with molten sodium at a temperature above the decomposition temperature at the prevailing hydrogen partial pressure so that sodium hydride is not formed but impurities in the new gas are converted to insoluble compounds such as sodium sulfide and sodium oxide. The solid impurities are separated from the circulated molten sodium so that circulation of clean sodium-sodium hydride can be effected between the hydrogen absorption zone and the hydride decomposition zone. This is particularly important when hydride concentrations are carried into the range producing slurries rather than solutions. The preliminary scrubber may be operated with advantage using metals of lower cost than sodium in terms of cost of metal per unit weight of impurity removed. For example, fused eutectic mixtures of molten metals such as aluminum, lead, magnesium and the like may be employed under reforming conditions of temperature and pressure. For example, a eutectic mixture of aluminum and magnesium containing from 35–65% magnesium melts at 815–845° F. which is a convenient handling temperature for liquid metal. Hydrogen sulfide, water vapor and other impurities are chemically reacted out of the reforming effluent to form solid sulfides and oxides of aluminum and magnesium. The resulting oxides and sulfides are separated from the liquid metals and make-up metals are added in the proper proportions to maintain the circulating low melting eutectic.

Another method for preventing build-up of sodium sulfide and/or sodium oxides in the hydrogen recovery system has the advantage of providing preliminary partial desulfurization of the feed stock. Solid sodium sulfide is partially settled from the circulating melt after sodium hydride decomposition has been carried to the desired extent. A fluid dispersion of sodium sulfide in sodium is withdrawn from a low point in the settler and is used to contact the fresh naphtha feed undergoing hydroforming. The resulting period of contact at elevated temperature and pressure can be adjusted to desulfurize the feed to the desired level. The resulting sodium sulfide plus sodium hydrosulfide can be readily separated from the feed naphtha as by settling. Once equilibrium has been established, very little sodium and sodium sulfide need be withdrawn from the hydrogen recovery system to keep it in balance.

Although our invention is primarily applicable to providing hydrogen recycle for catalytic hydroforming, particularly operations of the fluid hydroforming type, it also may be applied with advantage to other catalytic conversions where hydrogenation or other hydro-conversion reactions are conducted in the presence of hydrogen introduced to the reaction zone at least partially in the form of preheated hydrogen containing recycle gas. Thus, there are a number of familiar catalytic hydro-conversions in which hydrogen is recovered from the effluent from the conversion zone for recycle. In the usual case, these conversions are hydrogen consuming so that hydrogen from an extraneous source must be added to the system.

Conventional conditions for catalytic hydroforming of naphtha stocks include a temperature of about 850–1000° F., at a pressure ranging from about 150 to about 750 p. s. i. g., a space velocity of about 0.1 to 10 WHSV and at a molar hydrogen to hydrocarbon ratio of about 2:1 to 10:1. A number of hydrodesulfurization processes for removing sulfur from hydrocarbon feed stocks operate under comparable conditions; usually a cobalt molybdate or tungsten-nickel sulfide type catalyst is used. In general, hydrodesulfurization conditions call for a temperature in the range of about 650°–850° F. at pressures of about 50–750 p. s. i. g. Similarly, mild hydrogenation processes for up-grading various hydrocarbon stocks such as cracked gasolines, catalytic cycle stocks, low grade lubricating oil distillates and shale oil are known using various types of nickel, molybdenum and tungsten sulfide catalysts at elevated temperatures from somewhat below the reforming level ranging up into the reforming range at superatmospheric pressures. Hydrocracking processes, both of the liquid phase and vapor phase types, employ hydrogen recycle at elevated temperature and pressure. The known processes usually employ a catalyst comprising an oxide or sulfide of a metal such as molybdenum, tungsten, zinc, iron, cobalt, nickel, chromium, for example, alone or in combination. The temperature is in the range of about 550–1000° F. at a superatmospheric pressure ranging up to 10,000 p. s. i. g. Analagously, the hydrogenation of coal to produce liquid fuels and/or chemicals employs hydrogen recycle to a conversion system using a tin-antomony chloride or iron compound type of catalyst at 850°–1050° F. and 300–6000 p. s. i. g.

We claim:

1. In a process for reforming hydrocarbon feedstocks in the presence of a reforming catalyst and recycle hydrogen gas, the improved method of separating hydrogen gas from the hot effluent from the reforming zone and for recycling said hydrogen gas to the reforming zone which comprises: contacting the hot effluent from the reforming zone in an absorption zone with a molten metal contact medium comprising a molten metal selected from the group consisting of alkali and alkaline earth metals capable of forming an equilibrium metal hydride with hydrogen at a temperature in the range of about 500°–1000° F., while maintaining a temperature-pressure relationship within the absorption zone providing a temperature less than the decomposition temperature of the metal hydride at the prevailing hydrogen partial pressure, whereby hydrogen in the hot effluent is absorbed in the molten metal contact medium as a metal hydride; separating the molten metal contact medium from the unabsorbed reforming effluent; regenerating hydrogen gas from the molten metal contact medium by adjusting the temperature-pressure relationship to provide a temperature greater than the decomposition temperature of the metal hydride at the prevailing hydrogen partial pressure; and recycling said regenerated hydrogen gas to the reforming zone.

2. The process of claim 1 in which the conversion effluent is first contacted with a liquid contact medium comprising a metal capable of forming an insoluble sulfide with sulfur compounds in the conversion effluent at a temperature greater than the decomposition temperature for metal hydride formation under the prevailing hydrogen partial pressure prior to passing the hydrogen containing effluent to the absorption zone.

3. The process of claim 1 in which contact medium is withdrawn from the absorption zone and is passed in indirect heat exchange relationship with contact medium within the absorption zone whereby exothermic heat of hydrogen absorption is utilized to supply heat for hydride decomposition.

4. The process of claim 1 in which the catalyst is a platinum-alumina type reforming catalyst.

5. The process of claim 1 in which the catalyst in the reforming zone is handled in the form of a fluidized solid particle.

6. The process of claim 5 in which the catalyst is a molybdenum oxide-alumina type reforming catalyst.

7. The process of claim 1 in which the contact metal is molten sodium.

8. The process of claim 7 in which the molten sodium contact medium is recirculated between the absorption zone and decomposition zone and in which the hydrocarbon feed is partially desulfurized prior to charging to the reforming zone by contact with a fluid mixture of molten sodium and sodium sulfide withdrawn from the recirculating molten sodium contact medium.

References Cited in the file of this patent

UNITED STATES PATENTS

| 1,855,355 | Kloepfer | Apr. 26, 1932 |
| 1,859,028 | Cross | May 17, 1932 |
| 2,034,068 | Wait | Mar. 17, 1936 |
| 2,374,109 | Layng et al. | Apr. 17, 1945 |
| 2,642,381 | Dickinson | June 16, 1953 |
| 2,656,304 | McPherson et al. | Oct. 20, 1953 |

UNITED STATES PATENT OFFICE
Certificate of Correction

December 16, 1958

Patent No. 2,864,761

Edmond L. d'Ouville et al.

It is hereby certified that error appears in the printed specification of the above numbered patent requiring correction and that the said Letters Patent should read as corrected below.

Column 6, line 57, after "temperature" insert —range—; column 7, line 11, for "300–6000" read —3000–6000—; lines 23 and 24, for "500°–1000° F." read —550°–1000° F.—.

Signed and sealed this 28th day of April 1959.

[SEAL]

Attest:
T. B. MORROW,
*Attesting Officer.*

ROBERT C. WATSON,
*Commissioner of Patents.*